(12) United States Patent
van den Berg

(10) Patent No.: US 6,651,585 B2
(45) Date of Patent: Nov. 25, 2003

(54) DEVICE FOR SUPPLYING FEED TO AN ANIMAL

(75) Inventor: Karel van den Berg, Bleskensgraaf (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 10/152,844

(22) Filed: May 23, 2002

(65) Prior Publication Data

US 2002/0174834 A1 Nov. 28, 2002

(30) Foreign Application Priority Data

May 23, 2001 (NL) .............................................. 1018145
Mar. 14, 2002 (NL) .............................................. 1020173

(51) Int. Cl.$^7$ ................................................ A01K 1/10
(52) U.S. Cl. .................................................. 119/51.02
(58) Field of Search ........................... 119/51.02, 51.5, 119/51.11, 53

(56) References Cited

U.S. PATENT DOCUMENTS

| | | | | |
|---|---|---|---|---|
| 5,309,864 A | * | 5/1994 | Harmsen et al. ......... | 119/51.02 |
| 5,778,820 A | * | 7/1998 | van der Lely et al. .... | 119/51.02 |
| 5,988,106 A | * | 11/1999 | van den Berg .......... | 119/51.02 |
| 6,371,047 B1 | * | 4/2002 | van den Berg .......... | 119/51.02 |
| 6,427,627 B1 | * | 8/2002 | Huisma ................... | 119/51.02 |

\* cited by examiner

Primary Examiner—Charles T. Jordan
Assistant Examiner—Elizabeth Shaw
(74) Attorney, Agent, or Firm—Penrose Lucas Albright

(57) ABSTRACT

An apparatus for feeding animals in quantities, mixtures and at temperatures that are individualized as ideal for each animal, the apparatus being provided with an animal identification device for identifying each animal, a computer with a memory, the memory containing consumption related data for each animal, the computer generating a signal for supplying a quantity of feed to a relevant animal based on data from the animal identification device and data from the memory. The data from the memory includes for each animal data of its feed intake based on the quantity of liquid which is mixed into the feed. The addition of liquid into the feed is controlled by the computer and the quantity of liquid introduced into the feed is based on data from the animal identification device and relevant data from the memory. Alternatively or additionally, the apparatus supplies feed controlled by the computer based on data from its memory for each animal of the relationship of feed intake of the animal and the temperature of the feed provided to the animal.

16 Claims, 1 Drawing Sheet

DEVICE FOR SUPPLYING FEED TO AN ANIMAL

Figure 1:
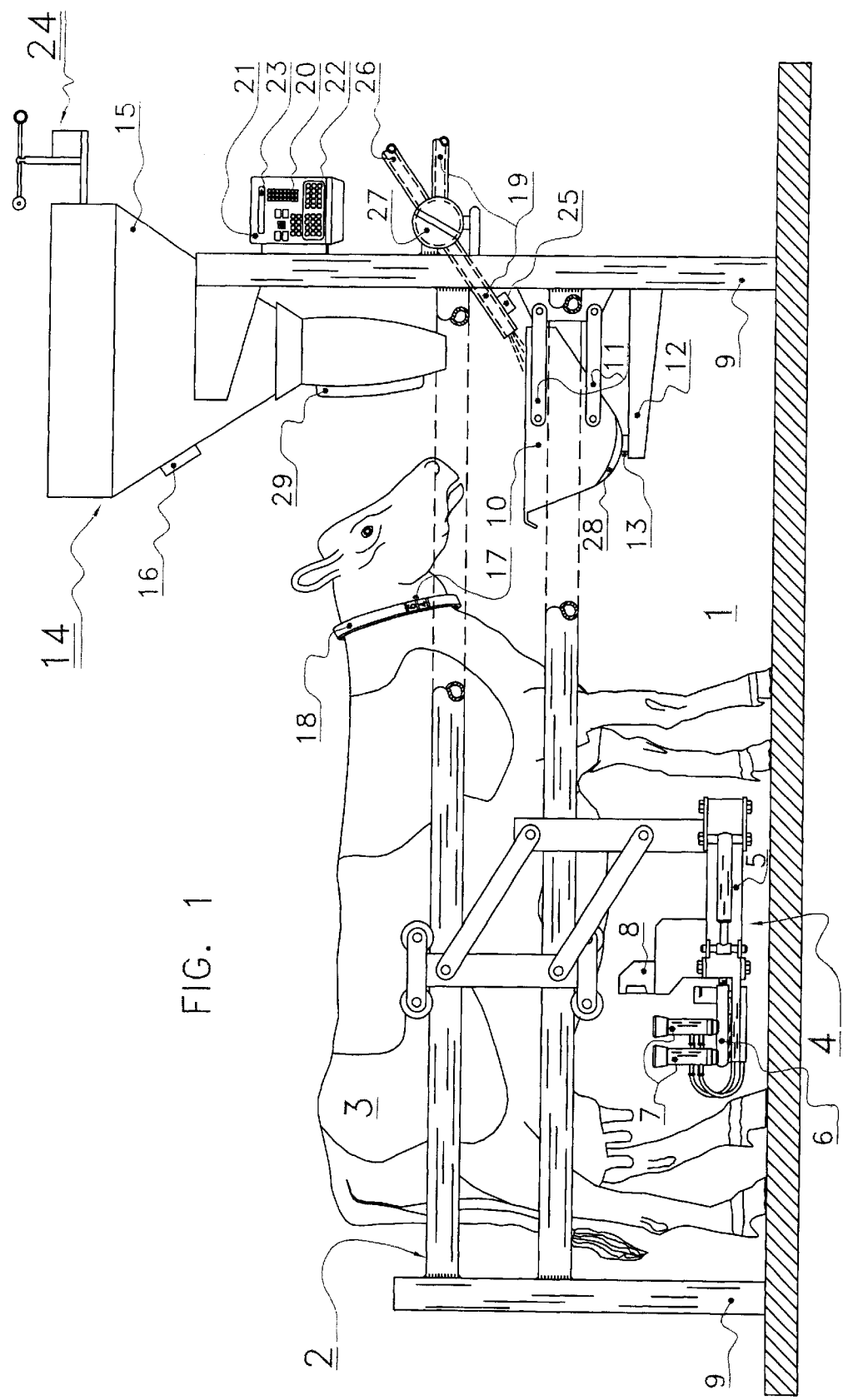

The invention relates to a device for supplying feed to an animal, according to the preamble of claim 1.

Such a device is known from the international patent application WO 96/05723. Although this known device functions satisfactorily, it has appeared in some cases that the feed intake by an animal may be improved.

It is an object of the invention to provide an improved device.

According to the invention, for that purpose a device for supplying feed to an animal comprises the measures according to the characterizing part of claim 1. The invention is based on the insight that it has appeared that animals consume an optimal amount of feed at a certain liquid content of the feed. For example, one animal is capable of consuming more feed when this feed is wetter, whereas another animal prefers dryer feed. Due to the fact that these data have been inputted into the memory and are preferably updated continuously, an optimal eating behaviour can be obtained. This is especially advantageous in the case of dairy animals, an optimal eating behaviour being advantageous to the milk yield of the dairy animal. Consequently, the device according to the invention is preferably integrated into a milking box.

Although WO 96/05723 discloses that by adding water to feed the feed intake may be improved, this document does not mention the possibility of varying per animal the amount of liquid to be added.

It is advantageous when the device for supplying liquid is provided with an additive device for adding additives to the liquid. Due to this, it is possible to add automatically for each animal individually certain additives, such as medicaments, vitamins, salts, minerals, and the like to the feed.

The device for supplying liquid is preferably provided with a device for heating or cooling the liquid. In some cases it has appeared that not only the amount of liquid to be added but also the temperature of the liquid is a factor which is determinative for the amount of feed consumed by an animal. According to the invention, there is thus provided a possibility of realising an optimal temperature for a desired feed intake. Especially when the liquid is a viscous liquid, heating ensures that the liquid becomes better processable.

In a preferred embodiment of a device according to the invention the device is provided with a device for supplying feed controlled by the computer, the data from the memory containing per animal data in relation to the feed intake in dependence of the temperature of the feed, and the device for supplying feed supplying to the animal an amount of feed having a corresponding temperature with the aid of data from the animal identification device and the relevant data from the memory. This embodiment of the invention is based on the insight that it has further appeared that animals consume an optimal amount of feed at a certain temperature of the feed. For example, one animal can consume more feed when this feed is relatively warm, whereas another animal prefers colder feed. Because of the fact that these data have been inputted into the memory and are preferably updated continuously, an optimal eating behaviour can be obtained. This is especially advantageous in the case of dairy animals, an optimal eating behaviour being advantageous to the milk yield of the dairy animal.

As a result thereof the invention also relates to a device for supplying an amount of feed to animals, said device being provided with an animal identification device for identifying an animal, with a computer having a memory, the memory containing consumption related data of the animals, the computer generating a signal for supplying an amount of feed to a relevant animal with the aid of data from the animal identification device and data from the memory, and with a device for supplying feed controlled by the computer, characterized in that the data from the memory contain per animal data in relation to the feed intake in dependence of the temperature of the feed, and in that the device for supplying feed supplies to the animal an amount of feed having a corresponding temperature with the aid of data from the animal identification device and the relevant data from the memory. The device may comprise several storage containers for feed having different temperatures, while the containers may optionally be provided with heating or cooling elements, thermally insulating walls and the like.

However, the number of storage containers may be limited when the device for supplying feed is provided with a device for heating or cooling the feed. Such a heating or cooling device may in particular be controlled by a temperature sensor present in the device for determining the amount of feed respectively the mixture of feed and liquid supplied to the animal. Such a sensor may be disposed for example in the feeding trough of the animal, and may be constituted by a contact sensor, a blank contact sensor (e.g. acting on infrared) or the like.

A preferred embodiment of a device according to the invention is characterized in that the data in the memory contain per animal data in relation to the feed intake in dependence of the environmental conditions, and in that the device comprises measuring means for measuring the atmospheric conditions. Due to this, it is possible to make the amount of liquid to be added per animal dependent of the environmental conditions. For example, at a high temperature and a high air humidity the amount of liquid to be added for an animal will be different than at a different temperature and/or air humidity.

An embodiment of a device according to the invention is characterized in that the device is provided with means for measuring the amount of feed consumed by an animal. Such a measurement may be used for updating the consumption related data in the memory, but may also be used for checking whether or not a relevant animal is healthy. A strongly reduced feed intake may be an indication of a certain illness of the animal.

In order to ensure during a longer period of time that an animal consumes the optimal amount of feed, the data in the memory are continuously updated.

A device according to the invention is preferably constituted by a so-called feeding column where several animals are eating simultaneously. Due to the automatic adding of liquid and/or temperature regulation of the feed according to the invention, the normal eating behaviour of the animals visiting the feeding column is not disturbed.

The invention will be elucidated hereinafter with reference to an embodiment shown in the drawing.

FIG. 1 is a schematic side view of an embodiment of a device according to the invention integrated into a milking box.

FIG. 1 is a side view of a milking/feeding box 1 comprising a fencing 2 which is disposed near the circumference of an animal 3, such as a cow, during its stay in the milking/feeding box 1. At one side of the milking/feeding box 1 there is disposed a milking robot 4. The milking robot 4 comprises e.g. a robot arm 5 having at its end teat cups 7 supported by a carrier 6. On the robot arm 5 near the teat cups 7 there is further provided a sensor 8 by means of which the position of the teats of an animal to be milked can be determined.

Near the front side of the milking/feeding box 1 a feeding trough 10 is fitted to a post 9. In the embodiment shown the feeding trough 10 is connected with the post by means of a parallelogram hinge construction 11. The feeding trough 10 is supported at its bottom side by a carrier beam 12. Between the carrier beam 12 and the bottom side of the feeding trough 10 there is further provided a measuring device 13 by means of which the weight of the feeding trough 10 and its contents can be determined. In the present embodiment the measuring device 13 comprises a piezo-element. It will be obvious that the invention is not limited to the specific way of measuring the contents of the feeding trough.

Above the feeding trough 10 there is fitted a feed metering device 14 to the post 9 for metering feed, such as concentrate, in the feeding trough 10. The feed metering device 14 comprises a hopper 15 for the feed. Against the outer wall of the hopper 15 there is disposed a receiver 16 constituting part of a (non-shown) animal identification device. The receiver 16 is capable of receiving the signals from a transmitter 17 which is fitted e.g. to a collar 18 around the neck of the animal 3. It will be obvious that various types of animal identification devices may be applied in the invention and that the invention is not limited to one type of animal identification device. Furthermore the receiver and the transmitter may be disposed at other places. For example, the receiver may be disposed on the feeding trough 10 and the transmitter may be implanted in the animal.

Near the upper side of the feeding trough 10 there is further fitted to the post 9 a device 19 for supplying liquid, e.g. a sprayer, by means of which an amount of liquid, e.g. water, or a viscous liquid such as syrup or treacle, can be added to the feed present in the feeding trough 10.

The device operates as follows:

After the animal 3 has entered the milking/feeding box 1 and the transmitter 17 has come in the receiving range of the receiver 16, the animal 3 is automatically identified by the animal identification device. In a manner known per se data in relation to the amount of feed which is supplied to a relevant animal per feeding are stored per animal in a memory 20 of a computer 21. The amount of feed to be supplied can be made dependent on the lactation stage of a relevant dairy animal, and/or on the milk yield of a dairy animal. The data in the memory contain per animal a so-called correspondence table in which the relation is defined between the productivity of the relevant animal and the feed intake respectively the amount of feed to be supplied related thereto.

When an animal 3 has been identified, the animal identification device sends a signal to the computer 21 which, with the aid of the data stored in the memory 20, controls the feed metering device 14 in such a manner that there is supplied an amount of feed corresponding with the animal.

For the purpose of optimising the amount of feed to be consumed by an animal, e.g. for increasing the milk productivity, an amount of liquid is added to the feed by means of the device 19 for supplying liquid. What should be the amount of liquid to be added per animal is determined per animal with the aid of the data from the memory 20 of the computer 21. These data contain per animal a relation between the feed intake and the amount of liquid added for obtaining e.g. a desired milk production. Thus, after an animal has been identified, the computer 21 supplies a signal for supplying the relevant amount of liquid to the device 19 for supplying liquid, the computer 21 making use of the relevant data from the memory 20.

The amount of liquid to be added can be made dependent on the lactation stage of a relevant dairy animal.

These data can be inputted into the memory 20 for the first use of the device according to the invention by making use of an inputting device, such as a keyboard 22. This can be done by a farmer who inputs values per animal according to his experience. For the purpose of facilitating the input and for checking the function of the device during the use thereof, the computer 21 comprises a display screen 23.

The device preferably comprises measuring means 24 for measuring the atmospheric conditions, such as temperature, air humidity, wind speed and the like. The data in the memory 20 may contain per animal a relation between the amount of liquid to be added in dependence of the environmental conditions, said relation leading to a desired feed intake.

In the embodiment described, after a visit of an animal to the feeding trough, the following data are thus stored in the memory: the amount of feed consumed by the animal, the amount of liquid added, the temperature, the air humidity and the wind speed (and with dairy animals the lactation stage of the animal or the milk yield). When an animal has consumed all the feed supplied, these data are stored in the correspondence table in the memory, so that at a next visit of the animal under equal conditions an equal amount of liquid can be added to the feed.

When the animal has not consumed all the feed, at the next visit of the animal to the feeding trough the amount of liquid to be added to the feed will be changed. To that end various approaches can be made. For example, the amount of liquid to be added can be increased by 5% at the next visit (of course, a different increase, or even decrease, is possible as well), after which the amount of feed consumed is measured. So the amount of liquid is automatically changed per visit of the animal to the feeding trough until the animal has eaten the complete amount of feed supplied. In the latter case the data are again recorded in the correspondence table as standard values. Otherwise they are stored temporarily for providing the possibility of determining the standard values. The control means may then be programmed to give priority to certain data for determining the amount of liquid to be added. Thus an order of priority may be: amount of feed consumed, milk yield, lactation stage, air humidity, temperature, wind speed. Of course, another order in dependence of the wishes of the farmer is possible as well. There is thus provided an iterative way of determining the amount of liquid to be added for obtaining the optimal feed intake.

The device 19 for supplying liquid is provided with a device 25 for heating or cooling the liquid, which device heats or cools the liquid to a temperature that is suitable for an optimal feed intake and possibly renders the viscous liquid better processable. The operation of the heating/cooling device 25 may also be controlled by the computer 21 with the aid of data emanating from the animal identification device and the data from the memory 20. There is further used a temperature sensor 28 determining the temperature of the mixture of feed and liquid supplied to the animal.

The device 19 for supplying liquid is provided with an additive device 26 for adding additives to the liquid. Said additive device may be controlled by the computer 21 which, e.g. in dependence of data from the animal identification device and data from the memory 20, controls a valve 27. In this manner certain additives, such as medicaments, vitamins, salts, minerals and the like, can be added to the feed for each animal individually.

By means of the measuring device 13 there is further determined how much feed a relevant animal has consumed during the feeding time. It is also possible to determine separately the amount of feed and the amount of liquid added. These data may be used for continuously updating the data in the memory, and adapting them, if required, to a varying eating behaviour of the animal.

Additionally or alternatively the memory 20 contains per animal data in relation to the feed intake in dependence of the temperature of the feed. The feed metering device 14 then supplies to an animal an amount of feed having the corresponding temperature with the aid of data from the animal identification device 16, 17 and the relevant data from the memory 20, for it has appeared that the optimal feed intake per animal also depends on the temperature of the feed. This temperature may be adapted to an animal by adding liquid having a certain temperature to the feed, as described above, but may also be adapted by adapting the temperature of the feed itself. This may take place for example in that the device comprises different hoppers with feed at different temperatures, and in that there is obtained per animal feed having the corresponding temperature by taking feed having an equal temperature from the hopper for feed, or by mixing feed from different hoppers until the desired temperature has been reached.

When the feed supplying device is provided with a device 29 for heating or cooling the feed, it can only comprise one hopper 15. Said heating or cooling device is disposed in particular near the exit of the hopper. The hopper 15 itself may be provided with a pre-heating respectively a pre-cooling. It is further possible to use a separate auxiliary reservoir for heating or cooling arranged between the hopper 15 and the feeding trough 10. Feed which is supplied to said auxiliary reservoir may then be cooled respectively heated. In the latter case it is advantageous when the auxiliary reservoir is provided with a temperature sensor for determining the temperature of the feed present therein. When this sensor indicates that the feed temperature attuned to the relevant animal has been reached, the feed from the reservoir can be supplied to the feeding trough 10. For that purpose the reservoir may be provided e.g. with a bottom which is adapted to be opened, or be designed so as to be capable of being tilted.

Although the present invention is described with reference to a device integrated into a milking box, it will be obvious that the invention may also be applied to a feeding column.

Having thus disclosed my invention, what I claim as new and to be secured by Letters Patent of the United States of America is:

1. An apparatus for providing feed which comprises a mixture of fodder and a liquid to an animal, which apparatus comprises: an animal identification device for identifying an animal being fed by the apparatus; a computer which includes a memory containing consumption related data of said animal, said computer generating a, signal for providing a quantity of feed to said animal wherein the feed's mixture of fodder and a liquid is based on data from said animal identification device and data from said memory; liquid supply means for supplying liquid which is mixed with fodder to be consumed by said animal, said liquid supply means controlled by said computer based on data in said memory relating to the historic feed intake of said animal and the quantity of said liquid which was mixed with said fodder when it was provided as to feed said animal, the quantity of said liquid being mixed into said feed being recorded and adjusted with the object that said animal's feed intake will be such that said animal will consume substantially all of said adjusted mixture of feed including said liquid introduced into it, said adjusted mixture being based on said animal's history of its feed intake over a range of mixtures of said fodder and liquid.

2. An apparatus in accordance with claim 1 further comprising means for introducing additives into said liquid.

3. An apparatus in accordance with claim 1 wherein said liquid is a syrup.

4. An apparatus in accordance with claim 1 wherein said liquid is treacle.

5. An apparatus in accordance with claim 1 further comprising temperature adjustment means for adjusting the temperature of said liquid.

6. An apparatus in accordance with claim 1 wherein said memory contains data of said animal as identified by said animal identification device of the feed intake of said animal in relation to the temperature of said feed, means for adjusting the temperature of said feed provided to said animal which is controlled by said animal identification device and data from said memory to provide said feed to said animal at a temperature which causes the maximum feed intake by said animal.

7. An apparatus for providing feed to an animal which comprises: an animal identification device for identifying said animal; a computer including a memory, said memory containing consumption related data of said animal, said computer generating a signal for providing a quantity of feed to said animal based on data from said animal identification device and data from said memory; feed supplying means controlled by said computer; temperature control means for controlling the temperature of feed provided to said animal based on data in said memory which indicates the optimum food intake of said animal based on the identity of said animal by said animal identification device and the history of feed intakes of said animal over a range of temperatures recorded as data in said memory.

8. An apparatus in accordance with claim 7, comprising feed temperature adjustment means for adjusting the temperature of said feed provided to said animal.

9. An apparatus in accordance with claim 7, comprising a temperature sensor and means for controlling the quantity of liquid mixed in to said feed supplied to said animal, said temperature sensor sensing the temperature of said mixture.

10. An apparatus in accordance with claim 7, comprising data in said memory of the feed intake of said animal under various environmental conditions and measuring means for measuring atmospheric conditions.

11. An apparatus in accordance with claim 7, comprising measuring means for measuring the quantity of feed consumed at each feeding by said animal.

12. An apparatus in accordance with claim 7, wherein the data in said memory are continuously updated.

13. An apparatus in accordance with claim 7, wherein said animal is a dairy animal and said data in said memory includes data as to the lactation stage of said animal.

14. An apparatus in accordance with claims 7, which is integrated into a milking compartment wherein said animal is milked by a robotic milking means.

15. An apparatus in accordance with claim 7, wherein said animal is a dairy animal and said memory contains data relating to the milk yield of said animal which is taken into consideration for determining the appropriate quantity of liquid which is introduced into said feed for said animal and the temperature of said feed which is provided to said animal.

16. An apparatus for providing feed to a dairy animal while being milked in a milking compartment which comprises means for providing a mixture of substantially dry feed and a liquid to said animal and for controlling the temperature of said mixture as it is being provided to said animal.

* * * * *